C. V. VIOLI.
TIRE HOLDER.
APPLICATION FILED JULY 22, 1913.
1,149,606.
Patented Aug. 10, 1915.
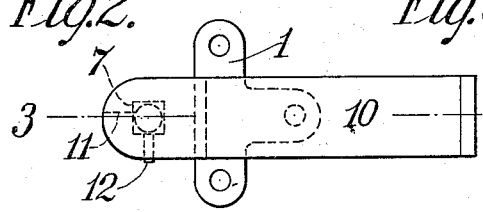
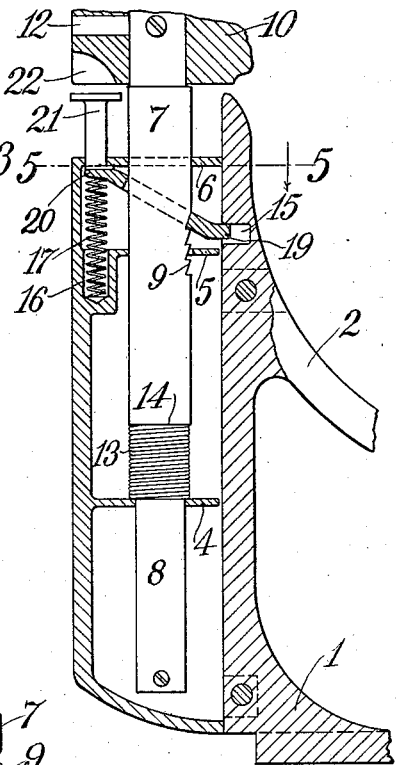
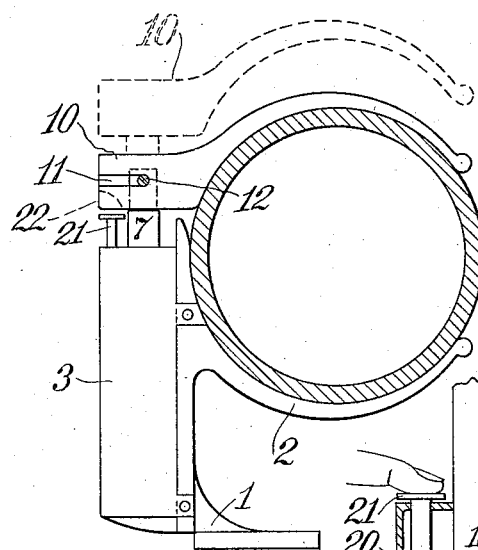
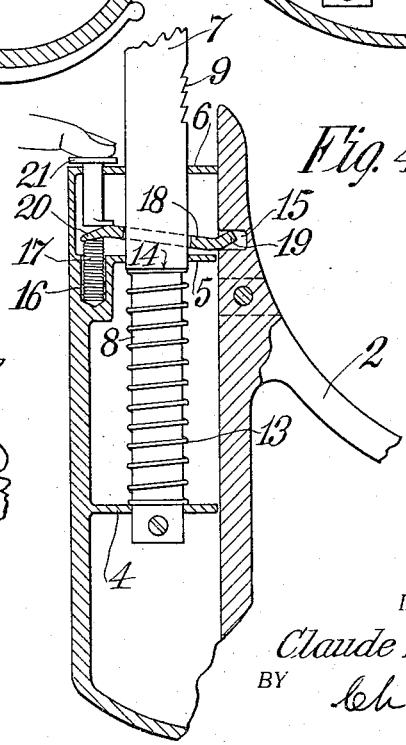
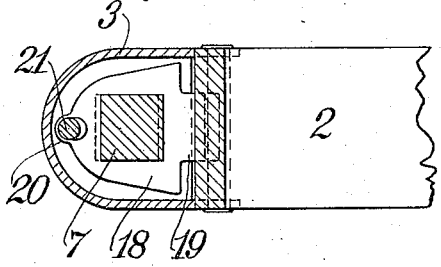
WITNESSES:
F. E. Hartwell.
G. M. Potter
INVENTOR.
Claude V. Violi.
BY
Chapin & Co.
ATTORNEYS

UNITED STATES PATENT OFFICE.

CLAUDE V. VIOLI, OF SPRINGFIELD, MASSACHUSETTS, ASSIGNOR OF ONE-HALF TO FRANKLIN E. McGEE, OF SPRINGFIELD, MASSACHUSETTS.

TIRE-HOLDER.

1,149,606.
Specification of Letters Patent.
Patented Aug. 10, 1915.

Application filed July 22, 1913. Serial No. 780,474.

*To all whom it may concern:*

Be it known that I, CLAUDE V. VIOLI, a citizen of the United States of America, residing at Springfield, in the county of Hampden and State of Massachusetts, have invented new and useful Improvements in Tire-Holders, of which the following is a specification.

This invention relates to a tire holder or tire clamp adapted to hold tires or similar articles and particularly useful for holding a reserve or substitute tire upon automobiles. I am well aware that tire holders in general for this purpose are old, but the tire holders I have seen have all been objectionable for the reason that they involve snaps, buckles, or straps which makes it a somewhat slow, cumbrous, and tedious operation to release the extra tire. My invention, on the other hand, comprises a construction whereby although the tire is held in an absolutely rigid, safe, and secure manner, yet it may be instantly released by the mere pressing of a button. Thus, by the use of my invention, should a puncture occur, the release of the reserve tire is the matter of an instant, the advantage of which is too obvious to be discussed. Furthermore, a tire may be placed into the tire holder in about the same small fraction of time in which it can be released therefrom. Either, one of these tire holders or two or three may be used upon one machine and to hold one tire, this being a matter of convenience.

In the drawings:—Figure 1 is an elevation of my tire holder complete showing a tire in cross-section held therein in one of its positions; Fig. 2 is a top plan view of my invention; Fig. 3 is a partial sectional view of my tire holder taken along the line 3—3 of Fig. 2; Fig. 4 is a sectional view similar to Fig. 3 to show the parts in a different position and one of the parts in an abnormal position; and Fig. 5 is a sectional plan view taken along the line 5—5 of Fig. 3.

In the drawings, 1 represents a casing or bracket having a tire holding arm 2.

3 represents a sleeve which may be either made integral with the casing 1 or fastened thereto as shown in the drawings.

Referring now to Figs. 3 and 4, the sleeve 3 has a web 4 spanning its interior and also a web 5, being closed at the top by the web 6 as shown. Mounted in alined orifices in the three webs 4, 5, and 6 is a square shank 7, being provided with a turned-down portion 8, notches 9, and carrying at its upper end the arm 10. This arm 10 is pivotally mounted upon the shank 7 and has therein a segmental slot 11 in which plays the stud or screw 12, the slot covering substantially a quadrant of arc, whereby the arm 10 may be turned to a position parallel with the fixed arm 2 or to a position at right angles thereto at will. A coil spring 13 is mounted to take against the web 4 and to bear against the shoulder 14 of the shank 7. The casing is provided near its upper end with a recess 15 and the sleeve 3 is provided with a pocket 16 in which is loosely seated the compression spring 17. Mounted at the rear end of the recess 15 and having its front end floating upon the spring 17 is a member 18 embracing the square shank 7 as clearly shown in Fig. 5. This member 18 is of peculiar form, being up-turned at its rear end 19 and slightly down-turned at its front end 20. A push-pin or plunger 21 is adapted to rest upon the front end of the member 18.

In operation, it may be clearly seen that as the shank 7 carrying the upper arm 10 is depressed from dotted line to full line position (see Fig. 1) the coil spring 13 will be compressed, and the parts will take a position such as shown in Fig. 3 in which the notches 9 upon the square shank 7 catch the edge of the member 18, this member thus being drawn out from its recess 15 and held rigid in the position shown where its rear end 19 is caught in the recess 15 and its front end 20 bears against the top web 6. In this position of the parts, the tire is firmly held and no amount of jarring or vibration will release it. Now, however, should it be desired to release the tire, all that it is necessary to do is to press down the push-button 21, member 10 being slightly cut away as shown at 22 to permit the ready entry of the finger, whereupon the member 18 will slide back in the recess 15, disengaging itself from the notches 9 and go to a position such as shown in Fig. 4 in which the push-button 21 is seen as being held down by the finger. The instant the member 18 disengages itself from the notches 9, the shank 7 carrying the arm 10 will spring to the dotted line position shown in Fig. 1 whereupon the tire may be removed either directly or, if necessary, by first swinging the arm 10 to a position at right angles to the one shown. To reëngage the tire or another tire, all that it is necessary to do is to place the tire between the arms and then to press the movable arm 10 down into a tight engagement with the tire, the detent 18 automatically engaging and holding the shank 7 in its depressed position.

Having now particularly pointed out my invention but well knowing that many departures and modifications may be made from the specific forms in which I have chosen here to illustrate it without departing from the scope of the invention which is more truly bounded and defined by the claims hereto appended, I claim:—

1. A releasable tire holder comprising a support carrying an arm, a post carrying an arm and slidably mounted in said support, a spring associated with said support and said post, a detent adapted to restrain said post against movement under the influence of the spring, and manually operable means for releasing said detent.

2. In a tire holder, a support comprising an arm, a notched post slidable in said support, a spring associated with said post and said support, a detent engageable with the notches in said post and pivotally mounted in said support, and a plunger adapted to release said detent from said post.

3. In a tire holder, a support having a recess, a post having teeth thereon, a detent member having one end located in said recess and its other end floating between a plunger and a spring, and said plunger and said spring.

4. In a tire holder and in combination with a support and a spring-pressed post having a tooth, a detent slidably and pivotally mounted in said support, and a plunger for operating on said detent.

CLAUDE V. VIOLI.

Witnesses:
HARRY W. BOWEN,
H. E. HARTWELL.

Copies of this patent may be obtained for five cents each, by addressing the "Commissioner of Patents, Washington, D. C."